US012701500B2

(12) United States Patent
Taneja et al.

(10) Patent No.: US 12,701,500 B2
(45) Date of Patent: Aug. 4, 2026

(54) PRIORITIZED SCHEDULING OF SCAN RADIO FOR FAST LOCATION AND ROGUE UPDATE RATES

(71) Applicant: Cisco Technology, Inc., San Jose, CA (US)

(72) Inventors: Raj Kumar Taneja, Twinsburg, OH (US); Matthew Aaron Silverman, Shaker Heights, OH (US); Lucy Huang, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 627 days.

(21) Appl. No.: 18/295,371

(22) Filed: Apr. 4, 2023

(65) Prior Publication Data

US 2024/0340775 A1     Oct. 10, 2024

(51) Int. Cl.
| *H04W 4/00* | (2018.01) |
| *H04W 48/16* | (2009.01) |
| *H04W 84/12* | (2009.01) |
| *H04W 88/08* | (2009.01) |

(52) U.S. Cl.
CPC ............ *H04W 48/16* (2013.01); *H04W 84/12* (2013.01); *H04W 88/08* (2013.01)

(58) Field of Classification Search
CPC ...................................................... H04W 48/16
USPC ......................................................... 370/338
See application file for complete search history.

(56) References Cited

U.S. PATENT DOCUMENTS

| 10,764,900 | B1 | 9/2020 | Gopalakrishnan et al. |
| 12,446,063 | B2 * | 10/2025 | Choi ................. H04W 28/0268 |
| 2008/0075035 | A1 | 3/2008 | Eichenberger |
| 2014/0185605 | A1 | 7/2014 | Oh et al. |
| 2015/0304814 | A1 | 10/2015 | Pandey et al. |
| 2015/0341939 | A1 | 11/2015 | Sharma et al. |
| 2019/0021093 | A1 | 1/2019 | Anderson et al. |
| 2023/0362698 | A1 * | 11/2023 | Gopalakrishnan .... H04W 48/16 |

* cited by examiner

*Primary Examiner* — Temica M Beamer
(74) *Attorney, Agent, or Firm* — Merchant & Gould P.C.

(57)     ABSTRACT

Prioritized scheduling of scan radio for fast location and rogue update rates may be provided. Channel events for a plurality of channels of an Access Point (AP) may be tracked. A scan score for at least one channel of the plurality of channels of the AP may be updated based on tracking of the channel events. A modified channel scanning schedule for the plurality of channels may be received based on scan scores for the plurality of channels. The modified channel scanning schedule may comprise an adjusted frequency of channel scan for the at least one channel of the plurality of channels for a predetermined number of scan cycles based on the updated scan score for the at least one channel. Channel scan for the plurality of channels may be performed based on the modified channel scanning schedule.

20 Claims, 3 Drawing Sheets

200

205 Start

210 Track channel events for a plurality of channels of an access point (AP)

220 Update a scan score for at least one channel of the plurality of channels of the AP based on tracking of the channel events 230 Receive a modified channel scanning schedule for the plurality of channels based on scan scores for the plurality of channels, wherein the modified channel scanning schedule comprises an adjusted frequency of channel scan for the at least one channel of the plurality of channels for a predetermined number of scan cycles based on the updated scan score for the at least one channel 240 Perform channel scan for the plurality of channels based on the modified channel scanning schedule 250 End

PRIORITIZED SCHEDULING OF SCAN RADIO FOR FAST LOCATION AND ROGUE UPDATE RATES

TECHNICAL FIELD

The present disclosure relates generally to prioritized scheduling of scan radio for fast location and rogue update rates.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. Modern APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
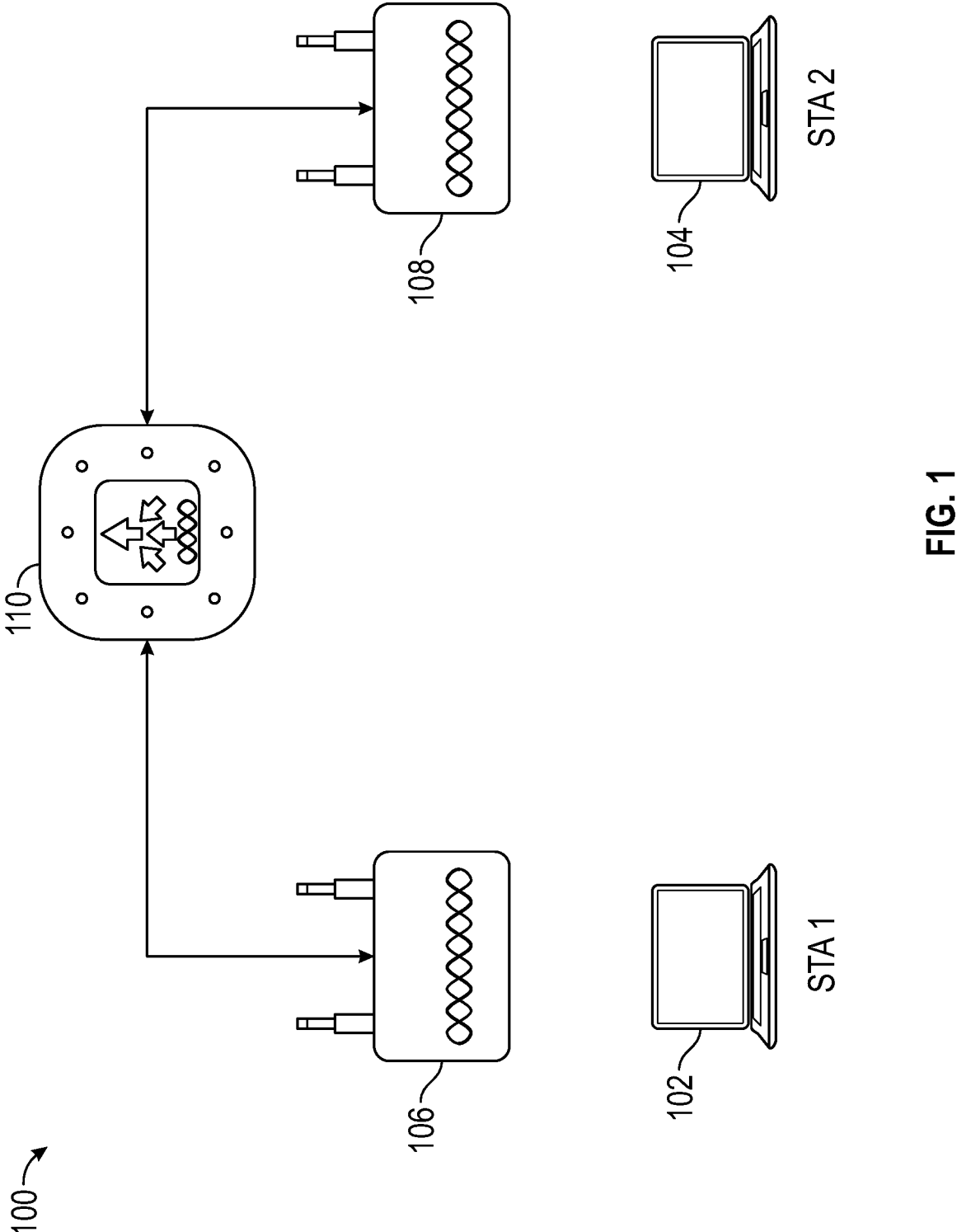
FIG. 1 is a block diagram of an operating environment.

Prioritized scheduling of scan radio for fast location and rogue update rates may be provided. Channel events for a plurality of channels of an Access Point (AP) may be tracked. A scan score for at least one channel of the plurality of channels of the AP may be updated based on tracking of the channel events. A modified channel scanning schedule for the plurality of channels may be received based on scan scores for the plurality of channels. The modified channel scanning schedule may comprise an adjusted frequency of channel scan for the at least one channel of the plurality of channels for a predetermined number of scan cycles based on the updated scan score for the at least one channel. Channel scan for the plurality of channels may be performed based on the modified channel scanning schedule.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Network elements in a Wireless Local Area Network (WLAN) may often need to know a location of devices communicating with the network. To determine the location of a device, a network element may send a request to the device and then may receive an acknowledgement in response. The network element then may determine characteristics of the signal containing the acknowledgement. For example, the network element may determine a Received Strength of Signal Indicator (RSSI) value. Other network elements may also determine the RSSI value for the same device. Then, a set of network elements may triangulate the position of the device based on the received RSSI values.

Fast Locate is a feature where multiple Access Points (APs) of the WLAN may scan a set of channels at the same time to get multiple RSSI values from an uplink transmission from a device and thus locate the device. A fast locate scheduler may periodically schedule Block Acknowledgement Requests (BAR) frames on serving radios at overlapping intervals where a location radio is also scheduled to scan on one of serving channels. Fast locate, thus, may take multiple APs in the network and may synchronize their scan radio schedule to the same channels. This may occurs even if there may be nothing to observe on those channels. For 6 GHz APs, this takes way too long (i.e., 20+ seconds) and may ruin update rates. The disclosure may provide processes for prioritized scheduling of scan radio for fast location and rogue update rates.

FIG. 1 shows an operating environment 100 consistent with embodiments of the disclosure for prioritized scheduling of scan radio for fast location and rogue update rates. As shown in FIG. 1, operating environment 100 may comprise a first station 102, a second station 104, first AP 106, a second AP 108, and a controller 110. Each first AP 106 and second AP 108 may be compatible with specification standards such as, but not limited to, the Institute of Electrical and Electronics Engineers (IEEE) 802.11 specification standard for example. First AP 106 and second AP 108 may communicate with each other to conduct operations in concert.

Controller 110 may be a Wireless LAN Controller (WLC) and may provision and control operating environment 100. Controller 110 may be implemented by a Digital Network Architecture Center (DNAC) controller (i.e., a Software- Defined Network (SDN) controller). First access point 106, second access point 108, and controller 110 may provide a WLAN. Through this WLAN, first station 102 and second station 104 may be provided with access to a wireless network that may be operated by an institution or an enterprise. Access to the WLAN may provide first station 102 and second station 104 with access to the Internet or other cloud-based networking environments.

First station 102 and second station 104 may comprise, but is not limited to, an AR/VR device, an AP, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network.

The elements of operating environment 100 (e.g., first station 102, second station 104, first AP 106, second AP 108, and controller 110) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of an operating environment may be practiced in a computing device 300.

Figure 2:
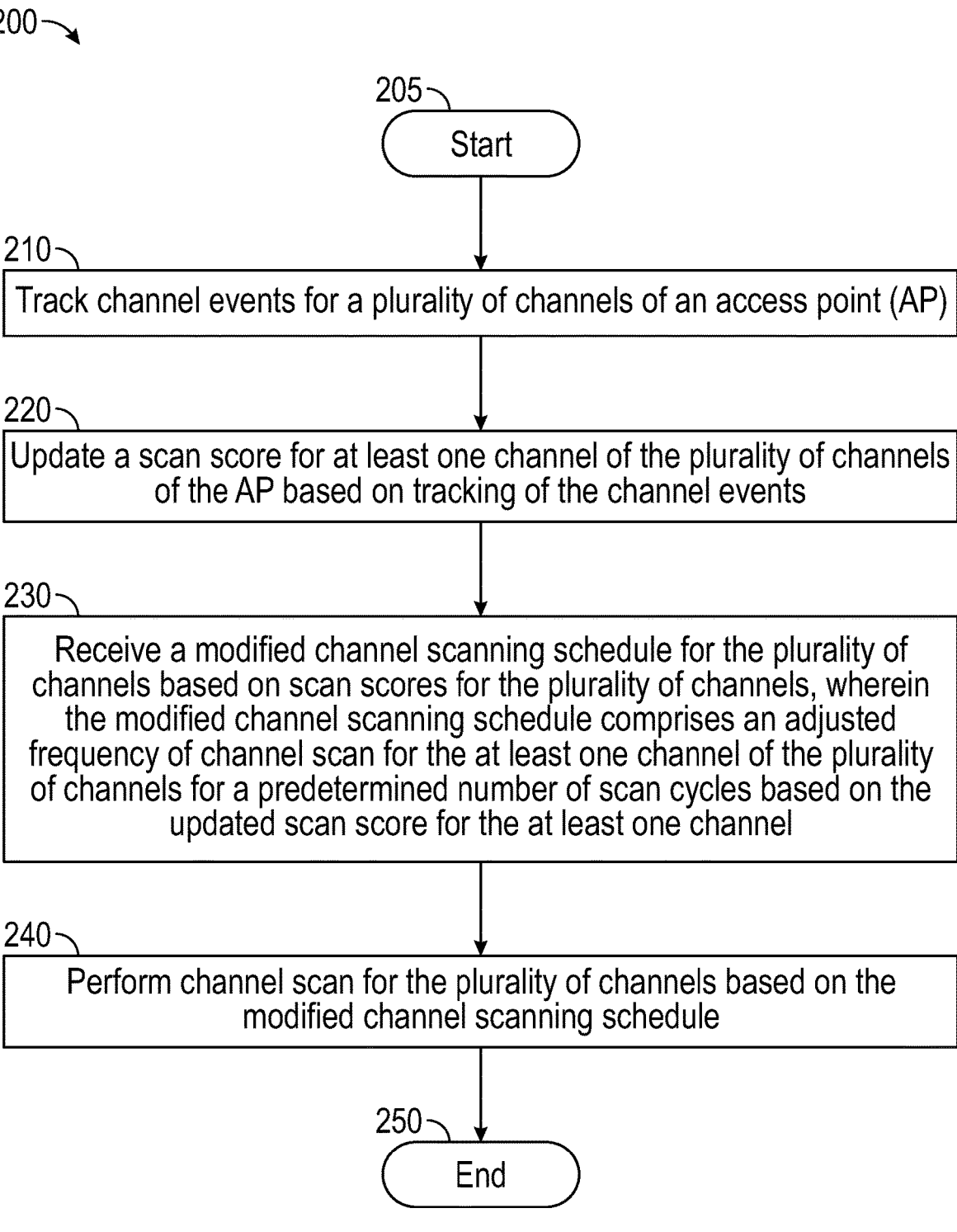
FIG. 2 is a flow chart of a method for prioritized scheduling of scan radio for fast location and rogue update rates.

FIG. 2 is a flow chart setting forth the general stages involved in a method 200 consistent with an embodiment of the disclosure for prioritized scheduling of scan radio for fast location and rogue update rates. Method 200 may be performed by first AP 106, second AP 108, or controller 110. Ways to implement the stages of method 200 may be described in greater detail below.

Method 200 may begin at starting block 205 and proceed to stage 210 where first AP 106 may track channel events for a plurality of channels of first AP 106. Channel events may include one or more of: a fast locate traffic, number of fast locate devices on seen on a channel, rogue APs detected, etc.

Once first AP 106 tracks channel events for a plurality of channels of first AP 106 in stage 210, method 200 may continue to stage 220 where first AP 106 may update a scan score for at least one channel of the plurality of channels based on the channel events. First AP 106 may maintain a scan score for each of the plurality of channels of first AP 106. At the beginning, each of the plurality of channels may be assigned a same scan score between a predefined minimum and a predefined maximum scan score. In addition, each channel events may be assigned an event score. The scan score of a channel may then be updated based on one or more channel events or lack of any channel event detected during tracking on that channel. For example, when a channel event is detected on a channel during tracking, then the event score associated with the channel event may added to the scan score of that channel. If no channel event is detected on a channel during for a predetermined number of scan cycles, then a predetermined score may be detected from the scan score of that channel.

In example embodiments, first AP 106 may create a list of prioritized channels and a list of deprioritized channels for first AP 106 based on the scan score of each of the plurality of channels. The list of prioritized channels may include one or more channels of the plurality of channels having the scan score higher than a first threshold. The list of deprioritized channels may include one or more channels of the plurality of channels having the scan score lower than a second threshold. The second threshold may be lower than the first threshold. First AP 106 may re-assess and send the scan scores, the list of prioritized channels, and the list of deprioritized channels to controller 110 at an end of each predetermined number of scan cycles.

Once first AP 106 updates the scan score for the at least one channel of the plurality of channels of first AP 106 based on tracking of the channel events at stage 220, method 200 may proceed to stage 230 where first AP 106 may receive a modified channel scanning schedule for the plurality of channels based on scan scores for the plurality of channels. The modified channel scanning schedule may comprise an adjusted frequency of channel scan for the at least one channel of the plurality of channels for a predetermined number of scan cycles based on the updated scan score for the at least one channel.

First AP 106 may receive a modified channel scanning schedule from controller 110. Controller 110 may create a channel scanning schedule for the plurality of channels based on scan scores for the plurality of channels. Initially controller 110 may create the channel scanning schedule in which each of the plurality of channels are scanned for a same number of times (i.e., a same frequency) in a predetermined number of scan cycles. Controller 110 may modify the channel scanning schedule at the end of a predetermined number of cycles based on scan scores for the plurality of channels. For example, controller 110 may adjust (i.e., increase or decrease) a frequency of channel scan for a channel of the plurality of channels based on an updated scan score (i.e., increased or decreased scan sore) for that channel.

In accordance with example embodiments, controller 110 may adjust (i.e., increase or decrease) a frequency of channel scan for a channel of the plurality of channels based on whether that channel is a prioritized channel or a deprioritized channel. In another embodiment, each channel on the list of prioritized channels may have a first frequency of channel scan and each channel on the list of deprioritized channels may have a second frequency of channel scan. The second frequency of channel scan may be lower than the first frequency of channel scan. Thus, channels with greater activity may be scanned more frequently or at a faster rate compared to channels with lesser activity in a predetermined number of scan cycles. In addition, the frequency of channel scan may be modified or updated at the end of each predetermined number of scan cycles to reflect latest channel events or lack of channel events.

Controller 110 may create and modify the channel scanning schedule for the plurality of channels of each of a plurality of APs (i.e., first AP 106, second AP 108, etc.) of operating environment 100. In accordance with some embodiments, instead of controller 110, first AP 106 may create and modify the channel scanning schedule for the plurality of channels of a plurality of APs in its neighborhood.

After AP 106 receives the modified channel scanning schedule for the plurality of channels in stage 230, method 200 may proceed to stage 240 where first AP 106 may perform channel scan for the plurality of channels based on the modified channel scanning schedule. Once first AP 106 performs channel scan for the plurality of channels based on the modified channel scanning schedule in stage 240, method 200 may then end at stage 250.

Figure 3:
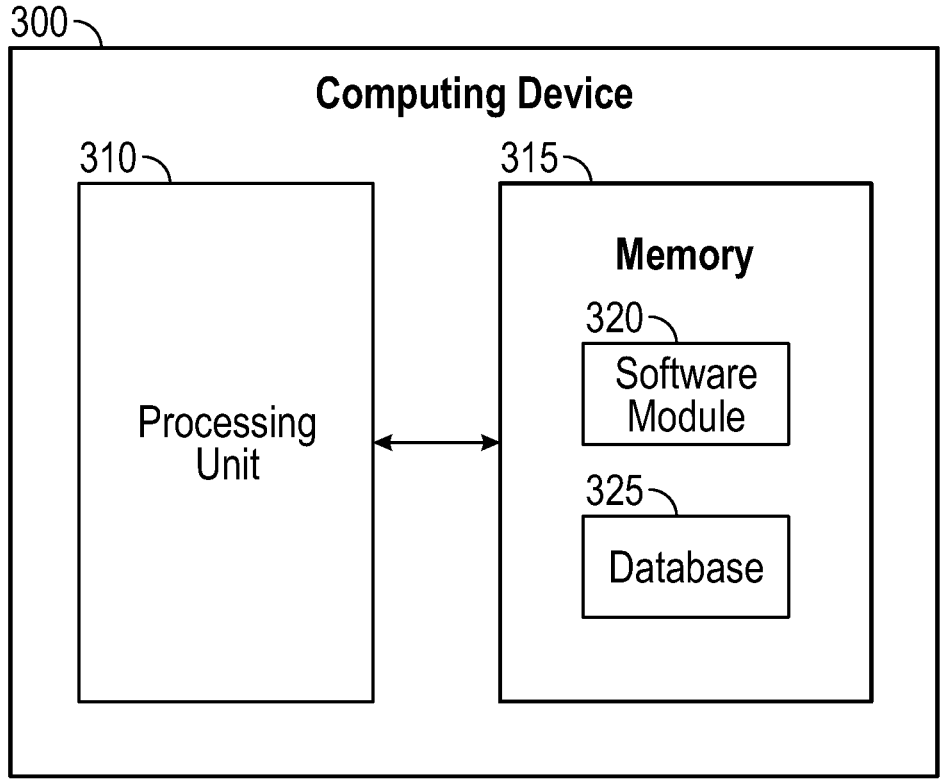
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for prioritized scheduling of scan radio for fast location and rogue update rates, including for example, any one or more of the stages from method 200 described above with respect to FIG. 2. Computing device 300, for example, may provide an operating environment for first station 102, second station 104, first AP 106, second AP 108, and controller 110. First station 102, second station 104, first AP 106, second AP 108, and controller 110 may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   tracking channel events for a plurality of channels of an
     Access Point (AP);

updating a scan score for at least one channel of the plurality of channels of the AP based on tracking of the channel events and an event score associated with each of the channel events;

receiving a modified channel scanning schedule for the plurality of channels based on scan scores for the plurality of channels, wherein the modified channel scanning schedule comprises an adjusted frequency of channel scan for the at least one channel of the plurality of channels for a predetermined number of scan cycles based on the updated scan score for the at least one channel; and performing channel scan for the plurality of channels based on the modified channel scanning schedule.

2. The method of claim 1, wherein receiving the modified channel scanning schedule comprises:

sending the scan scores for the plurality of channels to a Wireless Local Area Network (LAN) Controller (WLC); and receiving the modified channel scanning schedule for the plurality of channels from the WLC based on the scan scores.

3. The method of claim 1, further comprising:

communicating the modified channel scanning schedule to serving radios of the plurality of channels, wherein the serving radios transmit Block Acknowledgement (BA) based on the modified channel scanning schedule.

4. The method of claim 1, further comprising:

creating a list of prioritized channels and a list of deprioritized channels from the plurality of channels based on the scan scores for the plurality of channels.

5. The method of claim 1, wherein tracking channel events comprises tracking one or more of the following:

a fast locate traffic;

a number of fast locate devices; and rogue APs detected.

6. The method of claim 1, further comprising:

re-assessing scan scores for each of the plurality of channels after the predetermined number of scan cycles.

7. The method of claim 1, wherein the adjusted frequency of channel scan for the at least one channel increases with an increase in the scan score for the at least one channel.

8. A system comprising:

a memory storage; and a processing unit coupled to the memory storage, wherein the processing unit is operative to:

track channel events for a plurality of channels of an Access Point (AP);

update a scan score for at least one channel of the plurality of channels of the AP based on tracking of the channel events and an event score associated with each of the channel events;

receive a modified channel scanning schedule for the plurality of channels based on scan scores for the plurality of channels, wherein the modified channel scanning schedule comprises an adjusted frequency of channel scan for the at least one channel of the plurality of channels for a predetermined number of scan cycles based on the updated scan score for the at least one channel; and perform channel scan for the plurality of channels based on the modified channel scanning schedule.

9. The system of claim 8, wherein the processing unit being operative to receive the modified channel scanning schedule comprises the processing unit being operative to:

send the scan scores for the plurality of channels to a Wireless Local Area Network (LAN) Controller (WLC); and receive the modified channel scanning schedule for the plurality of channels from the WLC based on the scan scores.

10. The system of claim 8, wherein the processing unit is further operative to:

communicate the modified channel scanning schedule to serving radios of the plurality of channels, wherein the serving radios transmit Block Acknowledgement (BA) based on the modified channel scanning schedule.

11. The system of claim 8, wherein the processing unit is further operative to:

create a list of prioritized channels and a list of deprioritized channels from the plurality of channels based on the scan scores for the plurality of channels.

12. The system of claim 8, wherein the processing unit being operative to track channel events comprises the processing unit being operative to track one or more of the following:

a fast locate traffic;

a number of fast locate devices; and rogue APs detected.

13. The system of claim 8, the processing unit is further operative to:

re-assessing scan scores for each of the plurality of channels after the predetermined number of scan cycles.

14. The system of claim 8, wherein the adjusted frequency of channel scan for the at least one channel increases with an increase in the scan score for the at least one channel.

15. A non-transitory computer-readable medium that stores a set of instructions which when executed perform a method comprising:

tracking channel events for a plurality of channels of an Access Point (AP);

updating a scan score for at least one channel of the plurality of channels of the AP based on tracking of the channel events and an event score associated with each of the channel events;

receiving a modified channel scanning schedule for the plurality of channels based on scan scores for the plurality of channels, wherein the modified channel scanning schedule comprises an adjusted frequency of channel scan for the at least one channel of the plurality of channels for a predetermined number of scan cycles based on the updated scan score for the at least one channel; and performing channel scan for the plurality of channels based on the modified channel scanning schedule.

16. The non-transitory computer-readable medium of claim 15, wherein receiving the modified channel scanning schedule comprises:

sending the scan scores for the plurality of channels to a Wireless Local Area Network (LAN) Controller (WLC); and receiving the modified channel scanning schedule for the plurality of channels from the WLC based on the scan scores.

17. The non-transitory computer-readable medium of claim 15, further comprising:

communicating the modified channel scanning schedule to serving radios of the plurality of channels, wherein the serving radios transmit Block Acknowledgement (BA) based on the modified channel scanning schedule.

18. The non-transitory computer-readable medium of claim 15, further comprising:

creating a list of prioritized channels and a list of deprioritized channels from the plurality of channels based on the scan scores for the plurality of channels.

19. The non-transitory computer-readable medium of claim 15, wherein tracking channel events comprises tracking one or more of the following:

a fast locate traffic;

a number of fast locate devices; and rogue APs detected.

20. The non-transitory computer-readable medium of claim 15, further comprising:

re-assessing scan scores for each of the plurality of channels after the predetermined number of scan cycles.

\*    \*    \*    \*    \*